Patented Sept. 19, 1922.

1,429,265

UNITED STATES PATENT OFFICE.

WILLIAM ACHTMEYER, OF MIDDLETOWN, CONNECTICUT.

CONDENSATION PRODUCT OF PHENOL AND FORMALDEHYDE AND METHOD OF MAKING SAME.

No Drawing.   Application filed March 10, 1921.   Serial No. 451,342.

*To all whom it may concern:*

Be it known that I, WILLIAM ACHTMEYER, a citizen of the United States, and a resident of Middletown, in the county of Middlesex and State of Connecticut, have invented certain new and useful Improvements in Condensation Product of Phenol and Formaldehyde and Methods of Making Same, of which the following is a specification.

My invention relates to the production of a condensation product of phenol and formaldehyde, which will be thinly liquid and non-inflammable, and which will be convertible into a product having a high temperature of carbonization, so that it is suitable for impregnating objects which are exposed to high temperature in actual service.

Previous to my invention it has not been possible to employ condensation products of phenol and formaldehyde in the liquid state for impregnating purposes with any degree of satisfaction, as the liquid products are all too thick and viscous to thoroughly penetrate and impregnate the object to be treated; and while it is possible to make this liquid thinner by solution in a solvent, it has been generally necessary to employ so much solvent that the concentration of the condensation product is so low that the finished object will be of inferior strength and quality.

In the manufacture of phenol and formaldehyde condensation products, the use of catalyzing or condensing agents is not new, the principal advantage in their use being in the shorter time required to complete the reaction. Various condensing agents have been used, mostly of an acid or basic nature, and the different agents will affect the final product in different ways. The initial condensation mass may be liquid, pasty or solid, at ordinary temperatures which depends on the duration of the reaction and on the nature and amount of condensing agent used. To produce an initial condensation mass which is liquid when well known condensing agents are used, the action may be interrupted by any suitable means or method at an early stage thereof provided the condensing agent is present only in very small amounts; if present in large amounts it will be impossible to interrupt the action at all. For example, if the condensing agents are present in amounts up to ten per cent of the amount of phenol present, the re-action begins spontaneously at room temperature and proceeds very violently until a solid insoluble mass is formed, it being impossible to control this re-action at all. Then when small amounts of condensing agents are present it is very difficult to stop the reaction at the right moment, so as to prevent the mass from becoming too thick and viscous. Such a viscous mass may be very useful for molding purposes, but is not well adapted for the purpose of impregnation. With the well known initial condensation products an amount of solvent is required which varies between one and one-half and two times the amount of condensation product to make this product thin enough to penetrate into the objects it is desired to impregnate with the result that after evaporation of the solvent, the pores thereof would not be completely filled with the impregnating mass, and consequently a very weak and inferior product would result. If the reaction is interrupted too soon the water will not separate out, and furthermore the phenol and formaldehyde are not thoroughly combined. Objects which are impregnated with such a liquid are apt to blister if the hardening or final heating is not done under heavy pressure, and the finished articles are more or less brittle and without the necessary strength and firmness, and furthermore a considerable amount of formaldehyde will be lost.

Another draw-back when using the old type of condensation products is the injurious effect of the acids and alkalis which have been used as condensing agents upon fibrous material making it necessary to remove or neutralize such condensing agents.

I have discovered that these disadvantages may be overcome by using sodium tungstate as condensing agents, and that the sodium tungstate may be used either alone or together with other fire-proofing salts. The effect of sodium tungstate on the re-action is such that a product is obtained which is very useful for impregnating purposes, as a high penetrating power results due to its fluidity either without dilution by a solvent or by the use of a comparatively small amount of such solvent.

By the use of sodium tungstate alone, or mixed with other salts, I obtain a thinly fluid anhydrous product even though the salts are used in much larger amounts than may be necessary for the re-action. The re-action proceeds smoothly without overheating, frothing, or loss of material, and without the production of a difficultly soluble mass and without solidification of the product. The sodium trungstate alone or mixed with other salts although it acts as an accelerator also has the function of a retarder on the re-action after the formation of the anhydrous product, and by its use I prevent the formation of thick pasty or solid products. It permits the formation of anhydrous products on account of its property of abstracting water from the re-action mixture.

After completion of the re-action and during the cooling step the sodium tungstate will segregate from the mixture, leaving however about two per cent in the solution of the phenol re-action product. This small amount is not only harmless but beneficial in that it prevents the increase of the viscosity of the phenol condensation product which is to be used for impregnation purposes, whereas other condensing agents at normal temperatures cause a gradual thickening and an increase in viscosity even though slowly, which finally results in solidification of the product which is then useless for impregnating purposes.

My re-action product is non-inflammable and has a high temperature of carbonization, and increases in the finished objects the quality of resistance to fire as well as flexibility and toughness. As an example of the method of making my product, I may proceed as follows: one-hundred parts of phenol, one-hundred parts of forty per cent formaldehyde solution, three to five parts sodium tungstate, nine to twelve parts di or tri sodium phosphate are mixed in a suitable vessel provided with a reflux condenser, the parts given being by weight, and the salts being first dissolved in thirty to forty (30 to 40) parts hot water. After twenty-five to thirty minutes of heating a quiet re-action sets in without troublesome overheating or frothing. After constant boiling for about one hour and twenty minutes the liquid begins to appear turbid and at the end of about one and three-quarters to two hours the re-action is completed and the boiling stopped.

The mass has a characteristic alcoholic odor without any odor of phenol or formaldehyde, and consists of about forty-five to fifty per cent of thin anhydrous liquid on the bottom of the vessel and a watery layer which contains most of the salts on top. If larger amounts of salts are used in the re-action than necessary, then the watery layer holding the salts in solution will be below, the larger amount of salts not interfering with the re-action. Sodium tungstate may be used either alone as a condensing agent or it may be in part replaced by other salts, for example, a sodium phosphate as indicated above. The watery layer is removed in any suitable manner and the anhydrous re-action mass may be dissolved in alcohol or other solvent if necessary, which takes a comparatively small amount of solvent, about one-fifth to one-fourth of the amount of my product to obtain a very thin liquid with an exceedingly high power of penetration.

Objects impregnated with my compound which may be dissolved in a suitable solvent or not, after drying and expelling the solvent, can be rapidly hardened by heat at ordinary atmospheric pressure into very tough hard coherent and non-porous bodies. My product has a great variety of uses other than impregnating, such for example as molding. In place of the formaldehyde I may use any of the polymerids or equivalents thereof, for example, paraformaldehyde or trioxymethylene and in place of the phenol I may use any equivalent thereof, such for example, as crude carbolic acid or cresol.

I claim:

1. A thinly fluid solution comprising a phenol and formaldehyde condensation product and a solvent therefor, the amount of solvent being less than the amount of solute.

2. The process of condensing phenol and formaldehyde which comprises causing a re-action between the two in the presence of sodium tungstate.

3. The process of condensing phenol and formaldehyde which comprises causing a re-action between the two in a substantially neutral medium in the presence of sodium tungstate.

4. The process which consists in causing a re-action between one-hundred parts of phenol and one-hundred parts of forty-per cent formaldehyde solution in the presence of a solution of three to five parts of sodium tungstate and nine to twelve parts of sodium phosphate and thirty to forty parts of hot water and separating the watery layer formed from the re-action product.

5. A thinly fluid re-action product of phenol and formaldehyde comprising sodium tungstate.

6. A thinly fluid re-action product of phenol and formaldehyde, comprising about two per cent sodium tungstate.

7. A thinly fluid solution comprising a condensating product of phenol and formaldehyde and a solvent therefor, the amount of solvent being about one-fifth to one-fourth of that of the solute.

8. The process of condensing phenol and formaldehyde which comprises causing a re-action between the two in the presence of sodium tungstate and sodium phosphate.

9. The process of condensing phenol and formaldehyde which comprises causing a reaction between the two in a substantially neutral medium in the presence of sodium tungstate and sodium phosphate.

10. A substantially anhydrous thinly fluid solution comprising a phenol and formaldehyde condensation product and a solvent therefor, the amount of solvent being less than the amount of solute.

11. A substantially anhydrous thinly fluid reaction product of phenol and formaldehyde comprising sodium tungstate.

12. A substantially anhydrous thinly fluid reaction product of phenol and formaldehyde, comprising about two per cent sodium tungstate.

13. A substantially anhydrous thinly fluid solution comprising a condensation product of phenol and formaldehyde and a solvent therefor, the amount of solvent being about one-fifth to one-fourth of that of the solute.

WILLIAM ACHTMEYER.